B. N. BEARD.
COMBINED MIXER AND SPRINKLER FOR MAKING ROADS.
APPLICATION FILED JAN. 29, 1908.
909,134.
Patented Jan. 12, 1909.
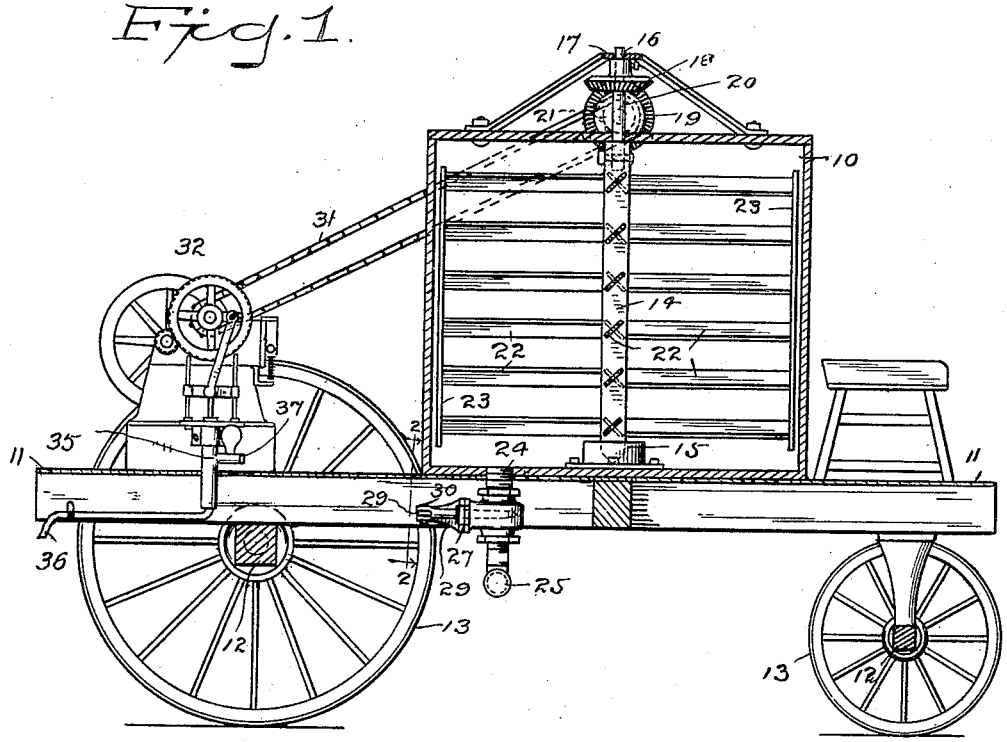
Fig. 1.
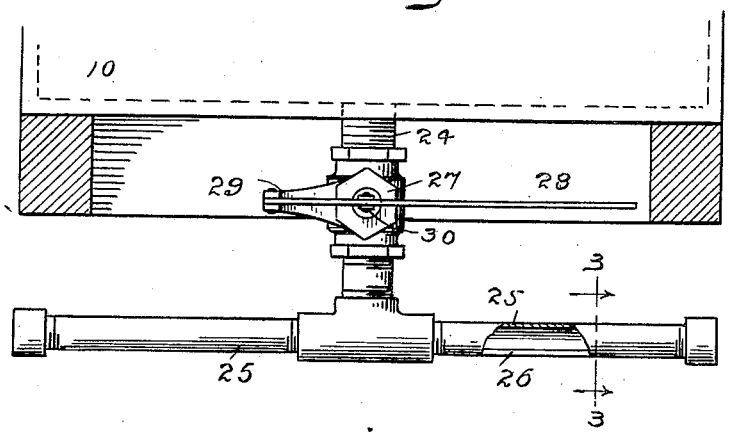
Fig. 2.
Fig. 3.
Witnesses:
Inventor
Bennett N. Beard
By Attorney

UNITED STATES PATENT OFFICE.

BENNETT N. BEARD, OF SHELTON, CONNECTICUT.

COMBINED MIXER AND SPRINKLER FOR MAKING ROADS.

No. 909,134.        Specification of Letters Patent.        Patented Jan. 12, 1909.

Application filed January 29, 1908. Serial No. 413,270.

*To all whom it may concern:*

Be it known that I, BENNETT N. BEARD, a citizen of the United States, residing at Shelton, county of Fairfield, State of Connecticut, have invented a new and useful Combined Mixer and Sprinkler for Making Roads, of which the following is a specification.

This invention relates to road making, and has for its objects to provide a combined mixing and layer spreading machine for depositing a thin mixture of water and cement in mechanical suspension upon the surface of roads.

I have found in practice that a relatively inexpensive, smooth and very durable road may be produced by first placing a lower stratum of relatively large stones with the voids filled with sand, then rolling thereon an upper stratum of relatively small stones, top dressing with sand and then grouting the road with a thin mixture of water and cement, the water causing the cement to fill the interstices of the upper stratum and the setting of the cement producing a hard, firm and very durable surface, and I have found furthermore that by rolling the surface of roads top dressed with gravel or broken stone, sprinkling with sand and then thoroughly saturating the surface with a thin mixture of water and cement in mechanical suspension that the hardness and durability of the road is greatly increased.

It is of course well understood that cement if allowed to set properly makes a very hard and durable road bed, but that as cement is ordinarily used, that is mixed with broken stone or gravel and then spread upon the road bed and rolled, it becomes partially set before the spreading and rolling operations are completed and the hardness and durability of the road bed is seriously impaired; in other words, in order to secure the best results from the use of cement in road making, it is necessary that the cement be placed on the road bed immediately after mixing and that the road bed remain undisturbed until the cement is set. This can only be effected by mixing the cement as it is used, depositing it quickly and allowing it to remain undisturbed on the road bed.

So far as I am aware, no machine has heretofore been produced which could be utilized for this purpose, it being required of course that the cement be held mechanically by the water and the mixture retained of uniform density until it is distributed upon the road or pavement foundation. In order to provide a machine for this purpose, I have devised the novel mixer and sprinkler of which the following description in connection with the accompanying drawing is a specification, reference characters being used to indicate the several parts:

Figure 1 is a longitudinal section of my novel mixing and layer distributing machine, certain of the parts being in elevation; Fig. 2 a horizontal section on an enlarged scale on the line 2—2 in Fig. 1; and Fig. 3 is a section of the delivery pipe on the line 3—3 in Fig. 2.

The essential features of my novel machine are a portable tank, an agitator in the tank, means for operating the agitator and means for distributing the mixture of water and cement on a road.

10 denotes the tank, which is supported by a portable platform 11 shown as provided with axles 12 and wheels 13. Within the tank is an agitator comprising a vertical shaft 14 stepped at the bottom, as at 15, and journaled at the top, as at 16. The shaft is extended above the top of the tank and the extreme end is journaled in a bracket 17 secured to the top of the tank. The shaft is provided with a bevel gear wheel 18 which meshes with a bevel gear wheel 19 on a short shaft 20 which is mounted to rotate in the bracket and is provided with a sprocket pulley 21 which may be double. Shaft 14 carries agitating arms 22 which are preferably connected at the ends by vertical strips 23.

24 denotes a short delivery pipe extending directly downward from the bottom of the tank and having at its lower end a transverse discharge pipe 25, the discharge pipe being provided in its underside with a longitudinal slot 26 through which the mixture of cement and water escapes freely.

27 denotes a valve in the delivery pipe for controlling the flow from the tank. This valve may be operated in any suitable manner as by a lever 28 pivoted to an arm 29 extending from the delivery pipe and also pivoted to the stem of the valve, as at 30. The agitator may be operated in any suitable manner, as by means of a sprocket chain 31 extending from a gasolene engine 32 also supported by the platform.

When my novel machine is used in city work where water is supplied by hydrants, the tank may be filled by running a flexible pipe from a hydrant. In order to provide for use of the machine, however, where there are no hydrants, I provide a pump 35 upon the platform and contiguous to the engine. In practice, the pump may be a semi-detached part of the engine, as shown in the drawing.

36 denotes a pipe leading from the pump to a water supply as a brook or a pond, and 37 a pipe leading from a pump to a tank.

In use, valve 27 is closed and the tank filled with water either from a hydrant or by means of the pump, then the required amount of cement is placed in the tank and the machine is started, care being of course taken to keep the agitator in motion so that the cement will not settle at the bottom of the tank. The machine will ordinarily be drawn by horses although the invention is equally applicable to a power-driven vehicle, if preferred. As soon as the machine is started, valve 27 is opened and the mixture of water and cement is discharged on the surface of the road through slot 26 in the discharge pipe. The machine may be kept in motion until the tank is emptied, the tank being then again filled with water as before and the cement placed therein. Should the machine be stopped before the tank is emptied, the agitator should be kept in motion in order to prevent the cement from settling and setting at the bottom of the tank.

Having thus described my invention I claim:

1. A machine of the character described comprising a portable tank, an agitator in the tank, means for operating the agitator, a short delivery pipe leading directly downward from the tank, and a transverse discharge pipe connected to the delivery pipe and having a longitudinal slot in its underside.

2. A machine of the character described comprising a portable tank, an agitator in the tank comprising a vertical shaft having agitating arms extending therefrom, and a bevel gear wheel, a short shaft having a bevel gear wheel meshing therewith, driving mechanism for imparting rotation to said shaft and means for distributing the contents of the tank on the surface of a road, said means comprising a short delivery pipe leading directly downward from the tank, and a transverse discharge pipe connected to the delivery pipe and having a longitudinal slot in its underside.

In testimony whereof I affix my signature, in presence of two witnesses.

BENNETT N. BEARD.

Witnesses:
A. M. WOOSTER,
S. W. ATHERTON.